United States Patent Office 2,811,486
Patented Oct. 29, 1957

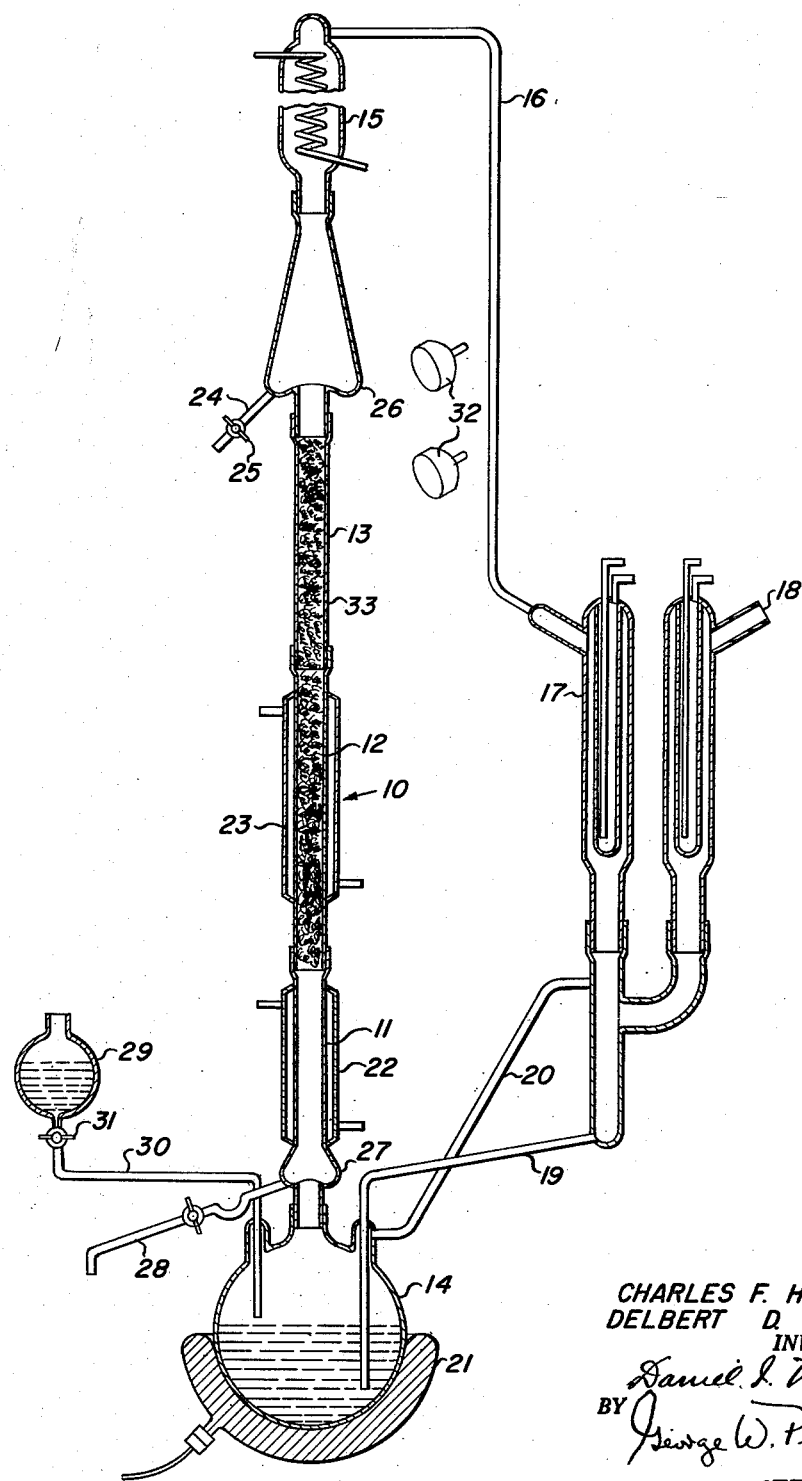

2,811,486

SIDE CHAIN CHLORINATION OF ALKYL BENZENES AND APPARATUS THEREFOR

Delbert D. Reynolds and Charles F. H. Allen, Rochester, N. Y., assignors to Eastman Kodak Company, Rochester, N. Y., a corporation of New Jersey Application June 9, 1954, Serial No. 435,512

3 Claims. (Cl. 204—163)

This invention relates to controlled side chain chlorination of alkyl benzenes and to apparatus therefor, and is particularly concerned with processes for continuously and progressively effecting side chain chlorination of alkyl benzenes and to continuous reactor apparatus particularly adapted for use in such processes.

Processes for chlorinating organic materials have been under investigation for many years to find optimum conditions for effecting controlled chlorination without objectionable overchlorination. The problem is particularly difficult in the chlorination of alkyl substituted aromatic compounds wherein one or more of the hydrogen atoms on the phenyl nucleus have been replaced by alkyl groups of 1-10 carbon atoms, when it is desirable to effect chlorination of the alkyl side chains only. One of the classic methods for effecting chlorination involves bubbling chlorine gas through a melt or solution of the material to be chlorinated. This method is difficult to control, however, and leads to the formation of objectionable amounts of overchlorinated product and tarry byproducts. The formation of such overchlorinated products and byproducts is particularly undesirable because such materials tend to polymerize and decompose during distillation whereby it is very difficult to distill out the desired side-chain chlorinated product in purified form.

In recent years, attempts have been made to improve the chlorination by the use of materials other than chlorine gas for effecting the chlorination and nitrosyl chloride and sulfuryl chloride have come into use. Sulfuryl chloride is of particular utility for chlorination reactions and best results are obtained when the reaction is catalyzed with an organic peroxide. Heretofore, the chlorination processes have been batch processes, however, and it has been difficult to effect large scale chlorination either in a true batch process or in a continuous batch process where material is continuously added and product is continuously withdrawn from the batch.

All batch processes suffer the disadvantage that large volume apparatus is necessary in order to produce product on a commerical scale. The use of such batch reactors necessitates the heating and cooling of large volumes of materials which slows down the process. Furthermore, batch operations usually require reaction times of several hours and the material which is chlorinated initially tends to overchlorinate or form tarry byproducts. Batch reactions on a large scale thus must be run to give an average result which involves forming not only the desired product but also substantial amounts of overchlorinated and underchlorinated material. This is in contrast to the results which can be obtained on a laboratory scale with the same reactants. Batch operations on a large scale are also difficult to control because of non-homogeneity of the mixture unless elaborate precautions are taken. Furthermore, chlorination with sulfuryl chloride is activated by ultraviolet irradiation of the reaction mixture and this is difficult to achieve satisfactorily with large volumes of reaction mixture. The long reaction times necessary for batch operations give rise not only to overchlorination but also to undesirable color formation.

A striking example of the difficulties involved in large scale chlorination by batch operations is the conversion of p-xylene to p-xylylene dichloride. On a laboratory scale in a batch operation, 21 g. of p-xylene has been reacted with 70 g. of sulfuryl chloride in the presence of 0.3 g. of benzoyl peroxide and in the sunlight to give a 58% yield of p-xylylene dichloride. Repeated attempts were made to effect the reaction on a semi-plant scale by similar batch operations, but the average yield for more than twenty batches was only 29% of the desired product. Furthermore the color of the product was poor and there was formation of a considerable amount of overchlorinated material. The presence of the tarry color formers and overchlorinated products caused polymerization and decomposition during attempts at purification by distillation. It is thus apparent that overchlorination and the formation of byproducts not only reduces the yield but also leads to a low quality product. In contrast to this, it has been found that when the product consists largely of xylyl chloride in admixture with xylylene dichloride, separation is readily effected by distillation without adverse effects and both fractions are of high quality. Furthermore, the xylyl chloride can be recycled for further chlorination and can be readily converted to xylylene dichloride.

It is accordingly an object of this invention to provide a new and improved process for effecting side chain chlorination of alkyl substituted aromatic compounds and particularly alkyl benzenes having alkyl groups of 1 to 10 carbon atoms without the concomitant formation of objectionable amounts of overchlorinated products and tarry byproducts.

It is another object of the invention to provide an improved method for continuously and progressively effecting chlorination of the side chains of alkyl benzenes at a high rate and with greatly reduced reaction times whereby the disadvantages inherent in batch operations, and particularly large scale batch operations, are largely overcome.

Another object of the invention is to provide new and improved apparatus particularly adapted for effecting chlorination by continuous reaction.

Another object of the invention is to provide apparatus for effecting continuous chlorination in a continuously circulating sulfuryl chloride stream flowing in cyclic fashion with the material being chlorinated moving in a generally inline flow through only a portion of the cyclic system to form a tangential reaction system involving continuous and progressive introduction of the material being chlorinated and withdrawal of product being formed combined with continuous recycling of the chlorinating agent in cyclic fashion.

Another object of the invention is to provide a process for continuously producing xylylene dischlorides of excellent quality in commercially feasible quantities.

Another object of the invention is to provide a readily controlled process for effecting side chain chlorination of alkyl benzenes in counterflowing liquid-vapor streams.

Other objects will be apparent from the drawings and from the description and claims which follow.

These and other objects are attained by means of this invention as described in detail hereinafter with particular reference to the preferred apparatus illustrated in the single figure of the drawings.

The single figure of the drawings is a view in elevation, partly in section, of a continuous reactor particularly adapted for effecting controlled chlorination in a tangential reaction system including cyclic flow of the chlorinating agent and generally inline flow of the material being chlorinated.

The present invention is particularly applicable for side chain chlorination, by means of sulfuryl chloride, of any of the alkyl benzenes wherein at least one hydrogen atom on a phenyl nucleus is replaced by an alkyl group of 1–10 carbon atoms and which are substantially less volatile than sulfuryl chloride. Thus typical materials which are chlorinated by means of this invention are m-xylene, p-xylene, toluene, p-cymene, ethyl benzene, isopropyl benzene, t-butyl benzene and similar well known alkyl benzenes containing one or more alkyl groups of 1–10 carbon atoms joined directly to a phenyl nucleus. The invention also includes the further chlorination of partially chlorinated alkyl benzenes such as m-xylyl chloride, p-xylyl chloride and the like which are readily converted to the corresponding xylylene dichlorides.

In general, the chlorination of the invention is effected in counterflowing liquid and vapor streams, and preferably between an upflowing sulfuryl chloride vapor stream and a downflowing liquid stream of an admixture of the alkyl benzene to be chlorinated, liquid sulfuryl chloride which is progressively revaporized from the admixture as the reaction proceeds, and a suitable catalyst such as an organic peroxide. The chlorination is activated by an initial untraviolet irradiation of the counterflowing streams followed by heating with the counterflowing streams in intimate contact to a temperature effective to vaporize sulfuryl chloride but ineffective to cause substantial vaporization of the material being chlorinated or the chlorinated product.

In the preferred process embodying the invention, a continuous circulation of sulfuryl chloride in cyclic fashion is established by progressively vaporizing sulfuryl chloride in a vaporizing zone, continuously passing the sulfuryl chloride vapors thus generated upwardly through a reaction zone defined within a generally tubular column including a portion filled with an inert packing material effective to cause flow through a multiplicity of tortuous constricted fluid passages, progressively condensing sulfuryl chloride vapors which have passed through the reaction zone and progressively returning the condensed vapors to the vaporizing zone for revaporization. Thus the chlorinating agent, sulfuryl chloride, continuously circulates in a cyclic system during the course of the reaction. Desirably, a portion of the vapors which have passed upwardly through the reaction zone are condensed in a partial condenser and caused to backflow down into the reaction zone wherein this partial condensate is progressively revaporized into the upflowing vapor stream.

With the sulfuryl chloride continuously circulating in cyclic fashion as described, the material to be chlorinated is progressively and preferably continuously introduced at a controlled rate into the reaction system at the top of the reaction zone, and is caused to flow downwardly in a liquid stream through the reaction zone countercurrent to the upflowing sulfuryl chloride vapors. The material to be chlorinated desirably contains a catalytic amount of a suitable chlorination catalyst, desirably an organic peroxide of the type well known in the art; and, in the most desirable process, the incoming material to be chlorinated is admixed with downflowing sulfuryl chloride partial condensate whereby the downflowing liquid stream includes the material being chlorinated, the chlorination catalyst, and liquid sulfuryl chloride. In counterflowing through the packed column portion, the liquid and vapor streams are in intimate contact whereby the desired side chain chlorination is continuously and progressively effected.

In the preferred practice of the invention, the counterflowing reactant streams are activated by ultraviolet irradiation in an upper part of the reaction zone and preferably from about the time of admixing of the downflowing liquid and through a portion of the passage through the packed column. This localized irradiation of the reactant streams gives effective activation since only relatively small amounts are irradiated at any one time and the reactant streams in the packed column are of relatively small cross section.

The irradiated liquid stream flows downwardly under gravity and enters a heated packed column portion where the chlorination proceeds and the liquid sulfuryl chloride is progressively revaporized into the upflowing vapor stream. In the relatively few minutes required for the alkyl benzene to traverse the length of the reaction zone, it is effectively chlorinated in the side chain without concomitant formation of overchlorinated products or tarry byproducts.

As the chlorinated product reaches the lower portion of the reaction column, it is desirably flowed in a thin film down the heated wall of an unpacked column section in which further stripping of sulfuryl chloride occurs. The chlorinated product is then withdrawn from the column into a suitable receiver.

The material being chlorinated thus traverses a generally linear path from the top to the bottom of the reaction zone, and this inline flow combined with the cyclic flow of the sulfuryl chloride prescribes a reaction system which geometrically resembles a circle and tangent. Therefore, the reaction system has been designated as a tangential reaction system based on the flow of the reactants during the process.

In the preferred practice of the invention, the amount of material to be chlorinated being introduced at the top of the reaction zone is correlated with the amount of chlorinated product being withdrawn from the bottom of the reaction zone whereby substantially no unchlorinated material remains at the bottom of the reaction zone. The sulfuryl chloride is present in great excess which also shifts the equilibrium of the reaction toward chlorination of all of the alkylated benzene, and the continuous withdrawal of product from the reaction zone maintains the most favorable conditions for chlorination. Since the passage through the reaction zone only takes a relatively few minutes in most cases and every increment undergoes identical treatment, substantially no overchlorination or formation of tarry byproducts results. The various conditions such as ratio of reactants, temperature, time of contact, feed rate and the like can thus be correlated for optimum results, and the process can then be run continuously for prolonged periods without substantial change in the product. Once the reaction is established, the amounts of sulfuryl chloride and alkyl benzene being introduced into the reaction system is equivalent to the amount of chlorinated product being withdrawn whereby substantially complete reaction is being effected. When the material being chlorinated contains two or more alkyl side chains, the product will usually consist of a mixture of monochloroalkyl and dichloroalkyl or polychloroalkyl benzenes. When it is desired to produce material in which all of the alkyl groups are chlorinated, the partially chlorinated products can be readily separated from the desired product by distillation or the like and can be admixed with the incoming feed in predetermined amounts for further chlorination. Unlike the overchlorinated products and tarry byproducts; the partially chlorinated products produce no adverse effects during distillation and hence a high quality product is readily obtained.

The process embodying the invention is readily carried out in apparatus as illustrated in the drawings. In general, the apparatus embodying the invention comprises a reaction column, including a packed column portion, through which upflowing vapors of sulfuryl chloride are channeled from a vapor generator to a partial condenser at the top of the column. The partial condenser is in turn connected with downwardly directed condenser effective to condense the remaining sulfuryl chloride vapors which have passed through the partial condenser and a suitable condensate line returns this condensate to the vapor generator for revaporization. Suitable feed means are provided for progressively introducing material to be chlorinated into the upper part of the reaction column, and means are provided for progressively withdrawing chlorinated product from the lower part of the reaction column. Suitable heating means maintain at least a lower portion of the reaction column at a temperature effective to vaporize sulfuryl chloride but ineffective to cause substantial vaporization of the material being chlorinated or the chlorinated product. A source of ultraviolet radiation is positioned so as to direct ultraviolet light against an upper zone of the reaction column.

Referring particularly to the drawings, a reaction column 10, consisting of an unpacked heated lower portion 11, a packed, heated intermediate portion 12, and an unheated packed upper portion 13, extends upwardly from a reservoir 14 for sulfuryl chloride to a partial condenser 15 which is mounted at the top of column 10 for gravity flow of condensate back into column 10. A vapor outlet 16 connects the top of partial condenser 15 with the top of a downwardly directed condenser 17 which is provided with a vent 18 for effluent gases and condensate return line 19 for returning condensate from condenser 17 to reservoir 14.

Condensate return line 19 is arranged to reintroduce condensate into reservoir 14 between the surface of the liquid in the reservoir and a pressure equalizing line 20 connecting the top of reservoir 14 with the bottom of condenser 17 serves to equalize the pressure and facilitate the return of condensate to the reservoir.

Reservoir 14 is provided with a suitable heater 21 for progressively vaporizing sulfuryl chloride in reservoir 14, and suitable heating means, such as the steam jackets 22 and 23, serve to maintain unpacked lower portion 11 and packed intermediate portion 12 of column 10 at a temperature effective to vaporize sulfuryl chloride.

A feed line 24 provided with a flow regulating valve 25 opens into the reaction system above upper packed portion 13 of column 10 whereby material to be chlorinated is progressively introduced into the reaction system either by gravity from a suitable reservoir (not shown) or by being pumped into the system in conventional fashion. Feed line 24 preferably opens into an alembic 26 directly above the upper packed portion 13 of column 10 and below partial condenser 15 whereby incoming feed is admixed with condensate from partial condenser 15.

A second alembic 27 at the lower end of column 10 serves to collect product flowing out of the reaction zone and a valve product withdrawal line 28 permits continuous or intermittent withdrawal of product from alembic 27. An unheated reservoir 29 is connected by feed conduit 30 with heated reservoir 14 for replenishing the pool of sulfuryl chloride being vaporized. A valve 31 in feed conduit 30 permits introduction of sulfuryl chloride either intermittently or continuously at a controlled rate.

One or more ultraviolet lamps 32, 32 are directed at alembic 26 and the upper packed portion 13 of column 10 for irradiating the reactant streams. The portions 12 and 13 of column 10 can be filled with any of the well known packing materials ordinarily used in packed columns, such as glass helices as indicated at 33, glass beads, Berl saddles or similar inert packing materials.

In carrying out the process embodying the invention, sulfuryl chloride is charged into reservoir 14 and progressively vaporized by heater 21. The vapors thus formed stream upwardly through column 10 with the flow being in a multiplicity of tiny streams through the packed column portions 12 and 13. Steam circulating through jackets 22 and 23 on column portions 11 and 12 maintains these portions at a temperature above the boiling point of sulfuryl chloride. After the vapors have passed through the reaction zone defined within column 10, they enter partial condenser 15 in which a portion of the vapors is condensed and flows back into the reaction zone where it is progressively revaporized as it progresses through the heated zones 11 and 12 of column 10.

The uncondensed portion of the vapors leaving partial condenser 15 is then condensed in downwardly directed condenser 17 and the resulting condensate is progressively returned to reservoir 14 for revaporization. Effluent gases are vented out of the apparatus through vent 18.

When this continuous circulation of sulfuryl chloride through the cyclic system is established, the material to be chlorinated together with a chlorination catalyst, such as an organic peroxide, is fed into alembic 26 at a controlled rate. This feed mixes with downflowing sulfuryl chloride condensate in alembic 26 and the mixture overflows down into the reaction zone proper beginning at the top of the packed portion 13 of column 10. As the liquid mixture flows downwardly countercurrent to the upflowing vapor stream, the reactants are activated by ultraviolet irradiation in the upper part of the reaction zone. Chlorination is effected during the countercurrent flow of the reactant streams through the packed portions 12 and 13 of column 10, and sulfuryl chloride is progressively stripped from the downflowing mixture. When the downflowing liquid reaches the unpacked portion 11 of column 10, the remaining sulfuryl chloride is stripped out of the mixture and the product collects in alembic 27 from which it is withdrawn through line 28.

The relative rates of introduction of the reaction components into the reaction zone is readily regulated by adjusting heater 21 and valve 25. The time necessary for the material being chlorinated to traverse the reaction zone will depend upon a number of factors including the viscosity of the downflowing mixture, the length of the column, the type of packing and the like. By a suitable correlation of the various factors involved, optimum results are obtained and the amount of chlorinated product being withdrawn is equivalent to the reactants being introduced. Once the desired conditions have been set up, control of the process is very simple and uniformity of results over prolonged periods is ensured.

The invention is illustrated by the following examples of certain preferred embodiments thereof, but it will be understood that the examples are included merely for purposes of illustration and are not intended to limit the scope of the invention unless otherwise specifically indicated.

*Example 1*

The process as described was carried out in chlorinating p-xylene in apparatus such as is illustrated in the drawings. The apparatus used had a 1-inch diameter column and the lower unpacked portion and the intermediate and upper packed portions were each 18 inches long. The packing employed consisted of ¼ inch glass helices. Sulfuryl chloride was vaporized until a continuous circulation through the cyclic system was established with a good back-flow from the partial condenser. A feed mixture of 10 g. of benzoyl peroxide in 1 kg. of p-xylene was then introduced to the top of the reaction zone at the rate of 400 g. per hour. Chlorinated product was continuously withdrawn throughout the reaction. The reaction product was mixed with an equal volume of ligroin and refrigerated for 18 hours. The p-xylene dichloride which separated was filtered, washed with ligroin and dried. The yield was 680 g. or a 41% yield of p-xylylene dichloride having a melting point of 97–99° C. Distillation of the filtrate gave 484 g. (47%) of p-xylyl chloride (B. P. 75–80° C., water pump vacuum), 145 g. (about 8% of low melting material (63–68° C.) which was a mixture of p-xylene dichloride with a small amount of overchlorinated material, and a 33 g. residue in the still pot.

Example 2

As has been described, partially chlorinated material can be readily chlorinated further, either separately or admixed with additional unchlorinated material. This is readily illustrated, for 800 g. of p-xylyl chloride obtained as in the preceding example was passed through the continuous reactor at a rate of 1200 g. per hour. The resulting reaction product was worked up as previously described to give 373 g. of additional p-xylylene dichloride.

Example 3

One kilogram of m-xylene containing 10 g. of benzoyl peroxide was passed through the continuous reactor at a rate of 430 g. per hour and was chlorinated as described. The reaction product was distilled under a water pump vacuum to give a product containing 811 g. (48.6%) of m-xylylene dichloride (B. P. 250–260° C.), and 460 g. (34.6%) of m-xylyl chloride (B. P. 198–200° C.).

Example 4

One kilogram of toluene containing 10 g. of benzoyl peroxide was chlorinated in the continuous reactor at a feed rate of 500 g. per hour using sulfuryl chloride as chlorinating agent. A 64% yield of benzyl chloride (B. P. 175–178° C.) was obtained together with 11% of unchlorinated toluene and some benzal chloride.

Example 5

A solution of 9.3 g. of benzoyl peroxide in 930 g. of p-cymene was chlorinated at the rate of 350 g. per hour. The reaction product was distilled at atmospheric pressure. During the distillation hydrogen chloride was evolved and the product appeared to be a mixture of 1-methyl-4-isopropylidene benzene and 1-chloromethyl-4-isopropylidene benzene.

Similar results can be obtained with other alkyl-substituted aromatic compounds, and the materials can be reacted in a single cycle or recirculated in accordance with usual practice. Various column sizes can be used, of course, depending upon the capacity desired, the contact time and the like. In a 100 cm. long column, the reaction time for xylenes is about 3 minutes, i. e. it takes 3 minutes for an increment to flow through the reaction zone. The feed rate is limited only by the flooding of the column as is understood by those skilled in the art.

The invention thus provides simple and compact apparatus for effecting chlorination continuously and progressively while obviating to a large extent the difficulties inherent in batch operations. The volume of reaction mixture which must be worked up is minimized because unreacted sulfuryl chloride remains in the reaction system even though present in large excess during the reaction. By a suitable control of the variable factors involved together with recycling of underchlorinated material, very high conversion efficiencies are realized. The process and apparatus are readily adapted for large scale production, and the process can be carried out continuously with minimum supervision. Once the reaction conditions have been adjusted, the process can proceed indefinitely with uniform results. Product of high quality is produced continuously, and color formation and production of overchlorinated material is reduced to an unobjectionable level. Because of the relatively small volume of reactants in the reaction zone as compared to batch operations, control of the reaction is readily accomplished.

Although the invention has been described in detail with particular reference to certain preferred embodiments thereof, variations and modifications can be effected within the spirit and scope of the invention as illustrated in the drawings and described hereinabove and as defined in the appended claims.

We claim:

1. The method of effecting side chain chlorination of xylene to form the corresponding xylylene dichloride which comprises counterflowing an upflowing stream of sulfuryl chloride vapors and a downflowing liquid stream of xylene containing an organic peroxide catalyst through a reaction zone defined within a packed column effective to cause flow through a multiplicity of constricted fluid passages, irradiating the counterflowing reactant streams with ultraviolet light in an upper portion of said reaction zone, heating the lower portion of said reaction zone to a temperature effective to vaporize sulfuryl chloride without substantially vaporizing said xylene, and continuously withdrawing chlorinated product from the lower end of said reaction zone at a sufficient rate to maintain the column in an unflooded condition throughout the process.

2. The method of effecting side chain chlorination of xylene to form xylylene dichloride which comprises continuously circulating sulfuryl chloride in a cyclic system by vaporizing sulfuryl chloride in a vaporizing zone, passing the resulting vapors upwardly through a reaction zone defined within a packed column, partially condensing a portion of said vapors at the top of said reaction zone and returning the resulting partial condensate to said reaction zone, and condensing the remainder of said vapors after passage through said reaction zone and returning the resulting condensate to said vaporizing zone, progressively introducing liquid xylene containing an organic peroxide catalyst, into the reaction system at the top of said reaction zone, causing said xylene in admixture with said partial condensate to flow downwardly through said reaction zone countercurrent to said upflowing vapors, irradiating the counterflowing reactants in an upper portion of said reaction zone, progressively revaporizing sulfuryl chloride from said admixture during flow downwardly through said reaction zone, and withdrawing side chain chlorinated xylene from the bottom of said reaction zone, said column being maintained in an unflooded condition throughout the process.

3. The method of converting xylene to xylylene dichloride which comprises continuously circulating sulfuryl chloride in a cyclic system by vaporizing sulfuryl chloride in a vaporizing zone, passing the resulting vapors upwardly through a reaction zone defined within a packed column, partially condensing a portion of said vapors at the top of said reaction zone and returning the resulting partial condensate to said reaction zone, and condensing the remainder of said vapors after passage through said reaction zone and returning the resulting condensate to said vaporizing zone, progressively introducing liquid xylene containing an organic peroxide catalyst into the reaction system at the top of said reaction zone, causing said xylene in admixture with said partial condensate to flow downwardly through said reaction zone countercurrent to said upflowing vapors, irradiating the counterflowing reactants in an upper portion of said reaction zone, progressively revaporizing sulfuryl chloride from said admixture during flow downwardly through said reaction zone, progressively withdrawing side chain chlorinated xylene from the bottom of said reaction zone, separating xylylene dichloride from xylyl chloride, and recirculating xylyl chloride to the top of said reaction zone for further passage through said reaction zone, said column being maintained in an unflooded condition throughout the process.

References Cited in the file of this patent

UNITED STATES PATENTS

| | | |
|---|---|---|
| 1,191,916 | Brooks et al. | July 18, 1916 |
| 1,202,040 | Ellis | Oct. 24, 1916 |
| 1,828,858 | Conklin | Oct. 27, 1931 |
| 2,193,824 | Lockwood et al. | Mar. 19, 1940 |
| 2,455,812 | Schlesman | Dec. 7, 1948 |

OTHER REFERENCES

Kharasch et. al.: Journal American Chemical Society, vol. 61 (1939), pp. 2142–2150.